Jan. 14, 1964 H. V. ALEXANDERSSON ETAL 3,118,021

MAIN EXCHANGE FOR AUTOMATIC CONNECTING DEVICES

Filed Oct. 27, 1959

INVENTORS
HARALD VALDEMAR ALEXANDERSSON
ERIC ARVID ERIKSSON
SVEN ERIK EVALD JOHANNESSON
BY
Hane and Nydick

ATTORNEYS

United States Patent Office 3,118,021

Patented Jan. 14, 1964

3,118,021
MAIN EXCHANGE FOR AUTOMATIC CONNECTING DEVICES

Harald Valdemar Alexandersson, Lidingo, Eric Arvid Ericsson, Stockholm, and Sven Erik Evald Johannesson, Hagersten, Sweden, assignors to Telefonaktiebolaget L M Ericsson, Stockholm, Sweden, a corporation of Sweden Filed Oct. 27, 1959, Ser. No. 849,084
7 Claims. (Cl. 179—91)

The present invention relates to a main exchange for automatic connecting devices. In such exchanges it is known to place the switching members in frames attached to the floor. The frames have then been placed side by side in rows with such a space between the frames that the service staff have been able to walk between them. Such an assembly gives a good accessibility, but requires much space and demands thereby long connecting cables between the different frames. Modern automatic telephone exchanges demand, however, little supervision, and it is even desirable to prevent the staff from adjusting the switching members too often.

When placing switch boards for high tension plants it has been suggested to place the boards against each other. The boards are removable so that they can be pulled forward to be made accessible to all parts. The switching devices of the boards are connected to a flexible cable. The purpose of the present invention is to adapt this principle for the above mentioned automatic telephone system. According to the invention this is obtained by attaching the flexible cables of the frames, constructed like sewn strips of matting or the like, to the lower part of the frame; the strips then lie in a bend between the frame and the floor, so that they roll out and in with the movements of the frame. This arrangement is especially advantageous when the frames are movably hung from a roof construction of beams above the frames in such a way that they are movable in their longitudinal direction. An open cable container lies below the frames on the floor, in which drum the cables are placed between the different frames, the bent flexible cables being placed in this cable container. It is suitable to place the cables between the different frames along a vertical beam in the rear part of the frames and there to connect these cables directly to a shifting device to which the separate selectors and relay sets of the frame are connected with plugs. The feeding conductors leading to a frame are arranged at the front side of the frame along the vertical front beam.

Figure 1:
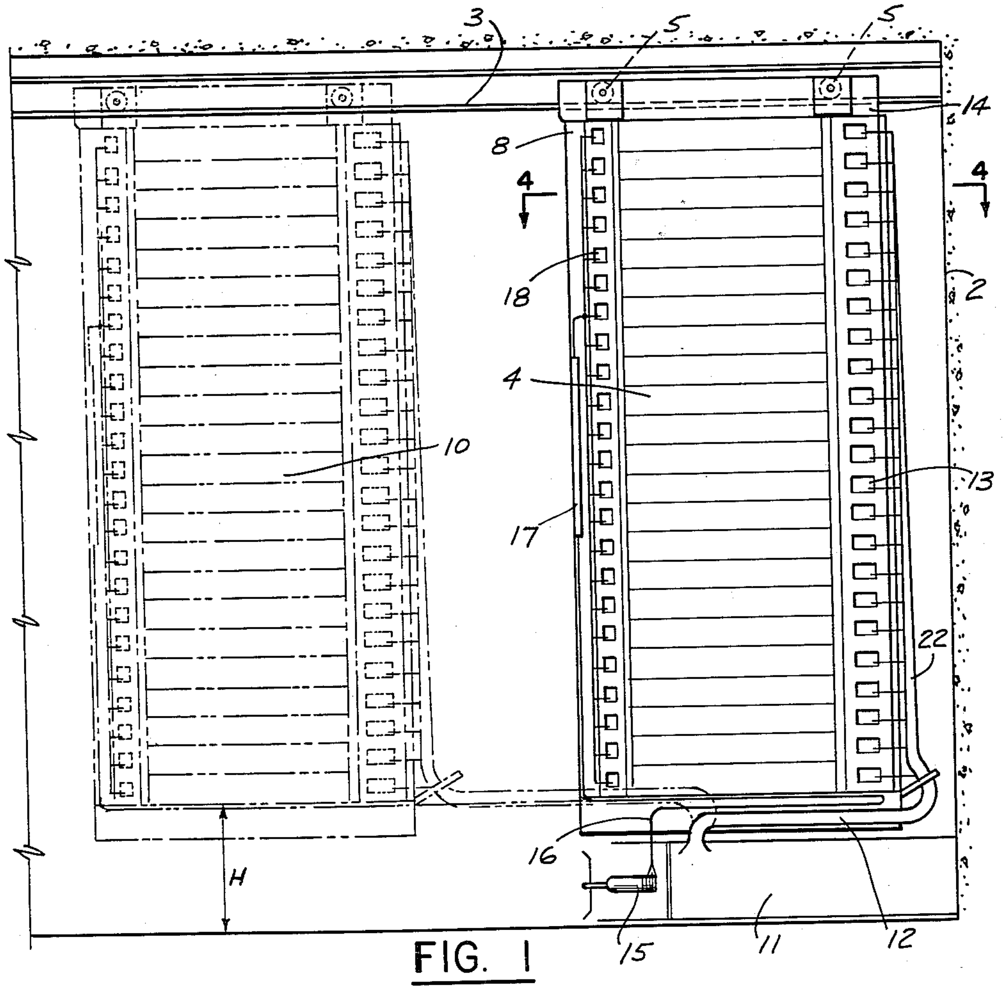
Figure 3:
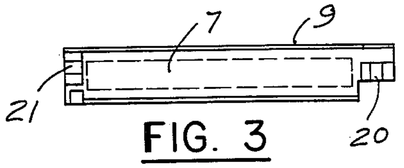
Figure 2:
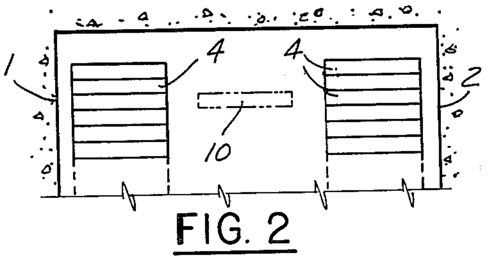
Figure 4:
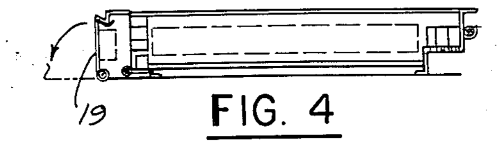

The invention will be further described with reference to the accompanying drawing. FIG. 1 shows in a vertical section of a telephone exchange room how the frames are hung. FIG. 2 shows schematically in horizontal section the placing of the frames in an exchange room. FIG. 3 shows a relay set of the frame, and FIG. 4 is a cross section of a frame along the line 4—4 in FIG. 1.

Between the walls 1 and 2 in a telephone exchange room there are a number of beams 3, in which the frames 4 are hung. The frames are movable in longitudinal direction by aid of rolls 5 and are arranged in two rows with a path between the rows as indicated in FIG. 2. Thus the vertical edges are in alignment. The individual frames can be pulled out in their longitudinal direction from the normal position at the middle of the path between the rows in a way shown by aid of the pulled out frame 10 due to the shown suspension arrangement. A frame pulled out in such a way is easily accessible from both sides, which makes the maintenance work simple and convenient.

Below the suspended frames the exchange cables lie in a cable container 11. This affords the advantage of utilizing a space which otherwise would be unused, as switching devices cannot be placed down to the floor for reasons of accessibility. For inspection the frame is pulled out in the path and the lowest member is then at a convenient height—H in FIG. 1—coresponding to the cabling space under the pushed in frames. The cables going to each frame are taken out in strips of matting or similar arrangements 12 lying below the frames. The strips of matting 12 are rolled out and in following the movements of the frame. The exchange cables 12 are led to the rear edge of the frame and are connected with jackets or shifting devices 13 attached to the rear beam 14 of the frame. The feeding conductors 15 are disposed at the front of the container and a terminal 16 is provided for each frame; the terminals are connected to the strips of matting of the exchange cable and brought to the front side in the frame, where they are connected to a fuse component 17. Individual feeding lines lead from this component to the switching devices 18 of the different selectors and relay sets in the front beam. The fuse component is suitably mounted inside box 19, FIG. 4, which can be turned outwards and normally covers the front of the frame. Lines common for the exchange other than the feeding lines are suitably placed in the inner edge of the frame, for example impulse lines, buzzer lines and test lines.

Members 7, placed in the frame, as selectors and relay sets, are constructed as shown in FIG. 3 with a long base plate 9. On this plate the plugs 20 and 21 corresponding to the switching devices 13 and 18 are attached. The plugs are movably attached to the base plate. Corresponding shifting devices or jacks 13 in the rear beam may then be fixedly mounted. These members 7 are only accessible when the frame is fully drawn out. The switching devices 21 on the base plate 9 are fixed and turned so that they are accessible when the box 19 is opened. The switching devices 21 can then suitably be used also for testing, blocking and so on of the belonging switching devices, without the frames having to be pulled out in the inspection path.

If an automatic telephone exchange is constructed in the mentioned way, it affords the advantage that the need for space decreases to circa half the space necessary for installations used up to now. In the embodiment of the invention advantages are also obtained with the mounting of the exchange, in that the exchange room is entirely free of standing frames, as there are merely beams in the ceiling. It is thus simple to lay the cables, which is entirely done on the floor and not in the ceiling as otherwise is normal. Hereby working time is saved and the work is convenient. The flexible cables are suitably constructed as sewn strips of matting of parallel multistrand, preferably plastic-moulded cables. If the cross connection of the exchange is placed straight below the exchange room, the laying of cables between the cross connection and the frame becomes very simple with very small consumption of cables, which further contributes to a cheaper way of mounting.

The suggested frames, which comprise an upper and a lower part, a front and a rear beam, are suitably delivered with unscrewed parts, which simplifies mounting work. The rear beam 14 can thus comfortably be wired while laid out on a working table, before it is hung up on the upper part. The front beam is then mounted similarly ready wired. Finally the bottom part is mounted, and then relay sets and selectors can be put in their places and their connections plugged.

We claim:

1. A telecommunications main exchange assembly for automatic devices, including separate components forming a plurality of separate frames, ceiling beams, said frames being suspended from said beams juxtaposed to one another in rows and displaceable longitudinally in reference to each other in said rows, switching devices associated with said frames, flexible cables connected together to form matting-like strips, and an open cable container disposed beneath each row of frames, said cable strips being disposed in said containers and connected to said switching devices.

2. A telecommunications main exchange assembly according to claim 1 wherein said frames include vertical rear beams, means connected to said vertical rear beams for connecting said switching devices to said cables, said cables being connected to said connecting means.

3. A telecommunications main exchange assembly according to claim 1 wherein said cables include feeding conductors which extend forward therefrom, one conductor thereof being connected to means carried by each of said frames for connecting said cables to said switching devices.

4. A telecommunications main exchange assembly according to claim 1 wherein said frames include a fuse component mounted on a rotatable member, said fuse component being connected to said switching device and to said cable.

5. A telecommunications main exchange assembly according to claim 4 wherein further switching devices are connected to a front beam of said frames for testing said switching devices, said testing switching devices being accessible when said mounting member for said fuse component is rotated.

6. A telecommunications main exchange assembly according to claim 1 wherein a gangway is disposed between said rows of frames, and said frames being adapted to be displaced over said gangway.

7. A telecommunications main exchange assembly including a plurality of frames hung from overhead beams, said frames being spaced from one another in rows and displaceable longitudinally from said rows, a gangway disposed between said rows over which said frames are displaceable, switching devices associated with said frames, an open cable container disposed beneath each of said frames, said cables being joined to form matting-like strips and disposed in said containers, said strips being connected to means secured to said frames for connecting said switching devices to said cables, fuse components carried in a recess of a movable member, other switching devices carried by said frames for testing purposes adapted to be accessible through said recess when said member is moved, said frames including a section that is accessible only when said frames are displaced over said gangway.

References Cited in the file of this patent

UNITED STATES PATENTS

| | | |
|---|---|---|
| 1,880,072 | Christian | Sept. 27, 1932 |
| 2,904,637 | Williams | Sept. 15, 1959 |
| 2,999,904 | Lohs et al. | Sept. 12, 1961 |

FOREIGN PATENTS

| | | |
|---|---|---|
| 1,052,466 | Germany | Dec. 20, 1957 |

OTHER REFERENCES

Bell Laboratories Record, vol. XXXV, #12, December 1957, pages 485–487.